No. 672,410. Patented Apr. 16, 1901.
J. H. TAYLOR.
MACHINE FOR MAKING HORSESHOE BLANKS.
(Application filed Aug. 2, 1900.)
(No Model.) 2 Sheets—Sheet 1.
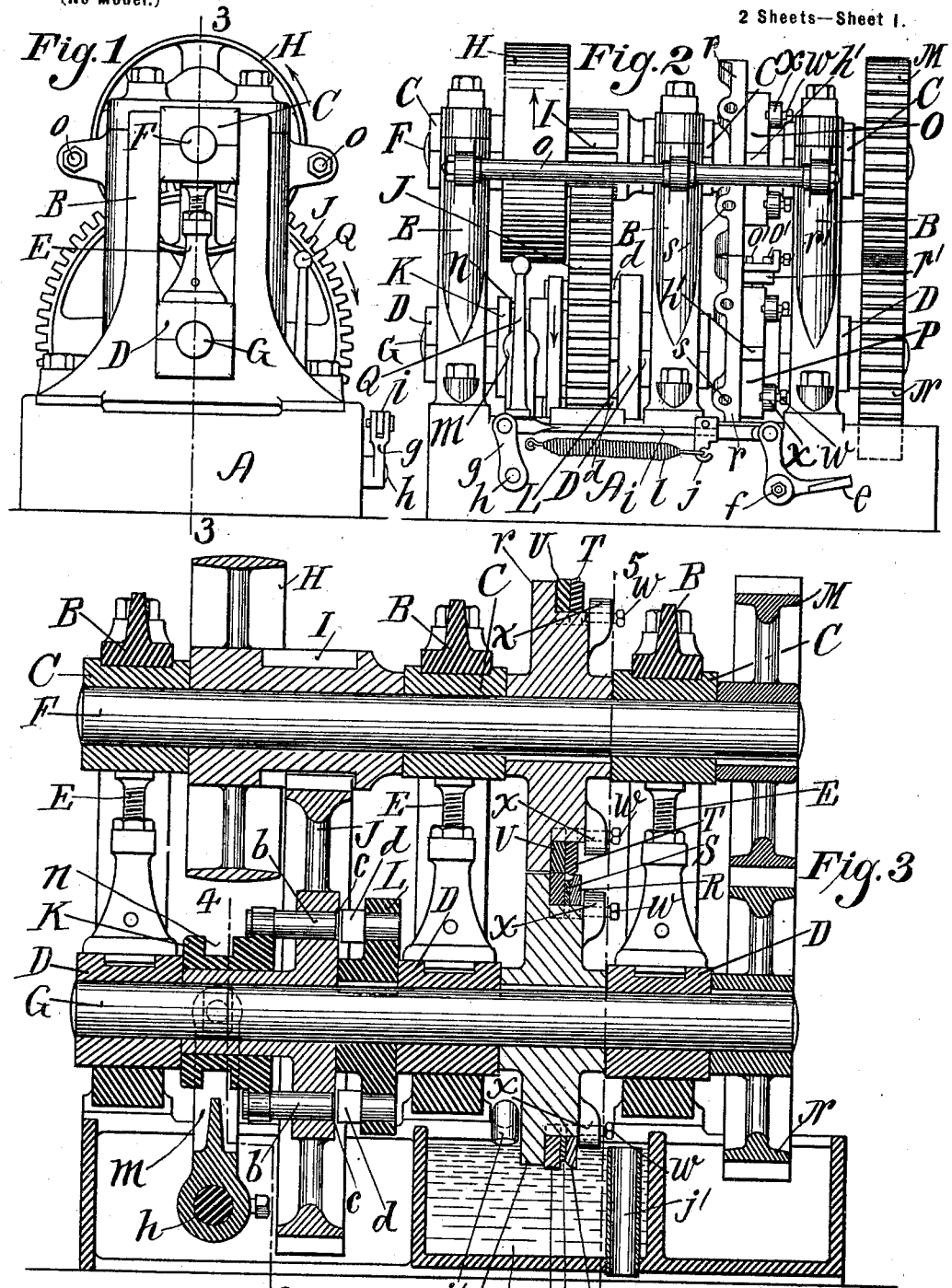

No. 672,410. Patented Apr. 16, 1901.
J. H. TAYLOR.
MACHINE FOR MAKING HORSESHOE BLANKS.
(Application filed Aug. 2, 1900.)
(No Model.) 2 Sheets—Sheet 2.
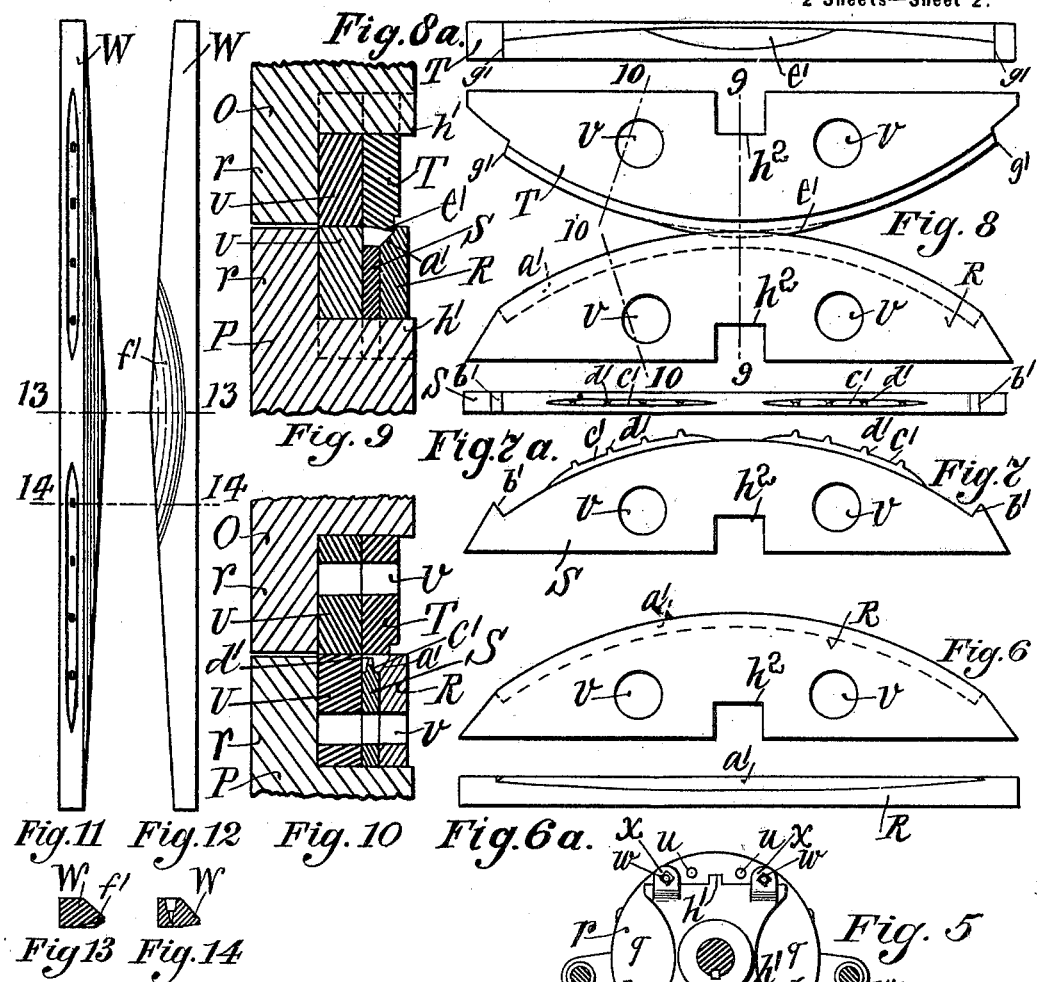
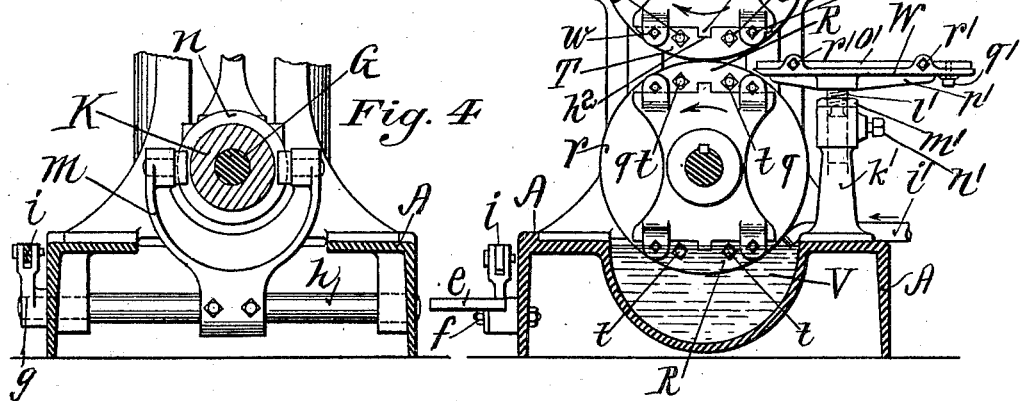
Witnesses.
Harry J. Garceau
Andrew J. Pitcher
Inventor.
James Henry Taylor
per S. Schofield
Attorney.
THE NORRIS PETERS CO., PHOTO-LITHO., WASHINGTON, D. C.

UNITED STATES PATENT OFFICE.

JAMES HENRY TAYLOR, OF PAWTUCKET, RHODE ISLAND, ASSIGNOR OF ONE-HALF TO RICHARD ROSCOW, OF SAME PLACE.

MACHINE FOR MAKING HORSESHOE-BLANKS.

SPECIFICATION forming part of Letters Patent No. 672,410, dated April 16, 1901.

Application filed August 2, 1900. Serial No. 25,715. (No model.)

*To all whom it may concern:*

Be it known that I, JAMES HENRY TAYLOR, a subject of the Queen of Great Britain, and a resident of Pawtucket, in the State of Rhode Island, have invented a new and useful Improvement in Machines for Making Horseshoe-Blanks, of which the following is a specification.

The nature of this invention consists in the improved construction and arrangement of the parts of the machine, as hereinafter fully set forth.

In the accompanying drawings, Figure 1 represents an end view of the machine. Fig. 2 represents a side view of the machine without the dies. Fig. 3 represents an enlarged longitudinal section taken in the line 3 3 of Fig. 1. Fig. 4 represents a detail section taken in the line 4 4 of Fig. 3. Fig. 5 represents a detail section, taken upon a reduced scale, in the line 5 5 of Fig. 3, with the upper segment-die removed. Fig. 6 represents an enlarged front side view, and Fig 6ª an edge view, of one of the dies. Fig. 7 represents a front side view, and Fig. 7ª an edge view, of the adjoining die to that of Fig. 6. The said dies of Figs. 6 and 7 are employed together side by side upon one of the die-holding heads. Fig. 8 represents a front side view, and Fig. 8ª an edge view, of the single die employed upon the opposite rotary head. Fig. 9 represents a section of the enlarged dies as taken in the line 9 9 of Fig. 8. Fig. 10 represents a section of the enlarged dies, such as would be taken when the radial lines 10 10 of Fig. 8 are made to coincide with the line 9 9 of Fig. 8 by turning the die-holding heads. Fig. 11 represents an under side view of the blank for forming a horseshoe, showing the creases and the holes for the nails. Fig. 12 represents a top view of the same, showing the concave recess at the upper surface of the shoe-blank. Fig. 13 represents a transverse section taken in the line 13 13 of Figs. 11 and 12. Fig. 14 represents a transverse section taken in the line 14 14 of Figs. 11 and 12.

In the drawings, A represents the bed-plate of the machine, to which are secured the upright housings B B B for supporting the upper bearing-boxes C C C and the lower bearing-boxes D D D, the said housings being connected together by means of the bolt-rods o o at opposite sides of the machine, and between the said bearing-boxes are placed the jack-screws E E E, by means of which the distance between the shafts F and G may be adjusted as desired. Upon the upper shaft F is placed the loose driving-pulley H, the hub of which is provided with the gear-pinion I, the teeth of which engage with the teeth of the gear J, which is arranged loosely upon the lower shaft G. Upon the hub $a$ of the loose gear J is placed the sliding clutch-sleeve K, provided with the projecting clutch-pins $b$ $b$, which pass through suitable perforations $c$ $c$ made in the side of the gear J and engage with the clutch-dogs $d$ $d$, secured to the clutch-disk L, which is firmly keyed to the shaft G, so that upon the engagement of the sliding clutch-pins $b$ $b$ with the clutch-dogs $d$ $d$ motion will be imparted from the driving-pulley H to the shaft G. The clutch-sleeve K is actuated for engagement and disengagement to start and stop the machine by means of the bell-crank pedal-lever $e$, pivoted to the bed A by means of the stud $f$, and from the upper end of the pedal-lever $e$ connection is made with the arm $g$ upon the transverse shaft $h$ by means of the connecting-rod $i$, upon which is placed the adjustable hook $j$, and between the hook $j$ and the stud K of the bed is placed the spiral spring $l$, which tends to keep the clutch pins and dogs out of engagement and the pedal-lever $e$ in its raised position, as shown in Fig. 2.

To the shaft $h$, which extends from side to side of the bed A of the machine, is secured the forked arm $m$, the ends of which engage with the annular groove $n$ of the clutch-sleeve K, and by means of the forked arm $m$ the clutch-sleeve is operated. The shafts F and G are driven connectedly at the same rate of speed by means of the equal gears M N, which are keyed to their respective shafts.

Upon the shafts F and G are keyed the rotary die-holding heads P and O, the said heads being shown in Fig. 2 without the duplicate sets of segment-dies for which they are adapted and with one of the segment-dies removed in Fig. 5, the said sets of dies being arranged diametrically opposite each other and made to extend for about a quadrant of the periphery of the die-holding heads, leaving the vacant quadrant spaces $q$ $q$ between the ends of the dies for the proper introduction of the heated bar to be operated upon. The die-holding heads are provided with the flange $r$, the periphery of which is provided with the sockets $s$ $s$, adapted to receive the end of a removable lever Q whenever it is desired to turn the machine by hand for the purpose of setting or changing the dies, the said lever Q being loosely retained when not in use in a holding-socket in the top of the bed A, as indicated in Figs. 1 and 2. The segment-dies R and S are secured to the rotary head P by means of the bolts $t$ $t$, which enter the screw-threaded holes $u$ $u$ in the flange $r$ and pass through the holes $v$ $v$ made in the dies, the said dies being also retained in position at their ends by means of set-screws $w$ $w$, which pass through the screw-threaded ears $x$ $x$. The die R is provided with the beveled surface $a'$, as shown in Figs. 6$^a$ and 10, and the adjoining die S is provided with the cutting-shoulders $b'$ $b'$ for making the shoe-blanks of the proper length, and with creasing projections $c'$ $c'$ and the spurs $d'$ $d'$ for punching the holes for the nails. The single die T in the opposite rotary head P is provided with a swell $e'$, adapted to form the concave $f'$ for the upper surface of the shoe-blank, and the ends $g'$ $g'$ of the die T are adapted to fit within the shoulders $b'$ $b'$ of the die S, and thus perform the end-cutting of the blank. The rotary heads O and P are provided with the lugs $h'$ $h'$, and the dies are provided with a corresponding notch $h^2$, and by means of the said lugs and notches the dies are firmly held in endwise position relatively to each other. A plain steel segment-block U is placed against the flange $r$ of the die-holding head to form a proper backing for the dies.

The bed A of the machine is provided with the well V, which is filled with running water through the inlet-pipe $i'$, the surplus water escaping through the outlet-pipe $j'$, and by means of the water in the well V the dies may be kept in a proper cool condition for operation upon the heated bars.

Upon one side of the machine, in range with the plane of the dies, is arranged the guide W for feeding the heated bar to the dies, the said guide being supported by means of the hollow standard $k'$, secured to the bed A of the machine and provided with a screw-threaded shank $l'$ and nut $m'$, whereby the said guide may be properly adjusted in height and be held in its adjusted position by means of the set-screw $n'$. The guide-strips $o'$ $o'$ are loosely secured to the guide-frame $p'$ by means of bolts $q'$ and are adjusted laterally to fit the sides of the heated bars which are being fed to the machine by means of the set-screws $r'$ $r'$.

When the heated bar from which the blank W is to be formed is fed forward between the dies, the said dies will operate to impart to the bar the desired form of cross-section and length, as shown in Figs. 11 and 12, the blank being then ready for bending in a separate machine to form a horseshoe. The employment of diametrically opposite duplicate sets of segment-dies having the vacant spaces between their ends allows the heated bar to be fed to the machine between the ends of the dies, so that the machine may be made to operate upon two bars at each revolution of the die-holding head.

What I claim as my invention is—

1. In a machine for making horseshoe-blanks, the combination of the parallel shafts, and the connecting-gears, with the rotary die-holding heads, secured to the shafts, and provided with means for holding the separate segment-dies at opposite sides of the axis of the shaft, the duplicate segment-dies for beveling the lower inner side of the shoe-blank held at opposite sides of the die-holding heads, and the duplicate segment-dies for creasing the blanks held at the side of the said beveling-dies, and the duplicate segment-dies for imparting a concave form to the upper inner side of the shoe-blank held in the opposite die-holding head, substantially as described.

2. In a machine for making horseshoe-blanks, the combination of the parallel shafts, the connecting-gears, the clutch, and the die-holding head provided with the sockets adapted for the insertion of a lever for turning the die-holding heads by hand when the clutch is disengaged, substantially as described.

3. In a machine for making horseshoe-blanks, the combination of the parallel shafts, the connecting-gears, and the die-holding heads, with the segment-die provided with the cutting-shoulders at its opposite ends and secured to one of the die-holding heads, and the segment-die provided with cutting ends fitting within the cutting-shoulders of the first-mentioned die and secured to the opposite head, and the creasing projections in one of the said dies, substantially as described.

4. In a machine for making horseshoe-blanks, the combination of the parallel shafts, the connecting-gears, and the die-holding heads, with the loose driving-pulley provided with the gear-pinion upon its hub, the loose gear engaging with the gear-pinion, the sliding clutch-sleeve upon the hub of the gear, the clutch-dogs, and the sliding clutch-pins passing from the clutch-sleeve, through the side of the gear, and means for actuating the clutch-sleeve, substantially as described.

5. In a machine for making horseshoe-blanks, the combination of the parallel shafts, the connecting-gears, and the die-holding heads, with the guide provided with the screw-threaded shank, the hollow standard, and the nut, whereby the guide is properly adjusted in height, and the guide-strips held at one end and laterally adjustable, substantially as described.

6. In a machine for making horseshoe-blanks, the combination of the parallel shafts arranged one above the other, the connecting-gears, the die-holding heads and the bearing-boxes for the shafts, the housing for the bearing-boxes, the driving-gear upon one of the shafts, the clutch and gear upon the other shaft, and the jack-screws for supporting the upper shaft and its die-holding head in proper elevated position, substantially as described.

7. In a machine for making horseshoe-blanks, the combination of the parallel shafts, the connecting-gears, and the die-holding heads provided with means for holding the separate segment-dies at opposite sides of the axis of the shaft, with the duplicate segment-dies secured to each of the die-holding heads at opposite sides of the axis of the shaft, and the water-tank for cooling the dies of the lower die-holding head, substantially as described.

8. In a machine for making horseshoe-blanks, the combination of the segment-die R, provided with the beveled surface $a'$, and the separate segment-die S, provided with the creasing projections $c'\ c'$, the said dies being also provided with the notch $h^2$ and the perforations $v$, substantially as described.

9. In a machine for making horseshoe-blanks, the combination of the segment-die R, provided with the beveled surface $a'$, and the separate segment-die S, provided with the creasing projections $c'\ c'$, with the opposite segment-die T, provided with the swell $e'$, the said dies being provided with the notches $h^3$, and the perforations $v$, for attachment to their respective die-holding heads, substantially as described.

JAMES HENRY TAYLOR.

Witnesses:
RICHARD ROSCOW,
SAMUEL H. ROBERTS.